United States Patent Office 2,855,426
Patented Oct. 7, 1958

2,855,426
O-(CYCLOHEXYLPHENYL) PHOSPHOROAMIDOTHIOATES

Kenneth C. Kauer and Edgar C. Britton, Midland, Mich., assignors to The Dow Chemical Company, Midland, Mich., a corporation of Delaware No Drawing. Application April 4, 1956
Serial No. 575,959

5 Claims. (Cl. 260—461)

This invention is concerned with the O-(cyclohexylphenyl) phosphoroamidothioates having the formula

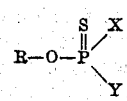

In this and succeeding formulas, R represents 4-cyclohexylphenyl, 2-cyclohexylphenyl, 4-chloro-2-cyclohexylphenyl or 2-chloro-4-cyclohexylphenyl, X represents methoxy or Y, and Y represents amino, methylamino or ethylamino. These new compounds are oily liquids or crystalline solids, somewhat soluble in organic solvents and of very low solubility in water. They have been found to be active as parasiticides and are adapted to be employed as active toxic constituents of compositions for the control of mites and insect organisms such as Mexican bean beetles and bean aphids.

The new compounds may be prepared by reacting ammonia, methylamine or ethylamine with an O-(cyclohexylphenyl) phosphorochloridothioate of the formula

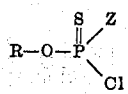

in which Z represents chlorine or methoxy. The reaction takes place smoothly at the temperature range of from —10° to 30° C. with formation of the desired product and ammonium or amine hydrochloride of reaction. Good results are obtained when employing at least four molecular proportions of ammonia or amine with each molecular proportion of the phosphorodichloridothioate or with two molecular proportions of the phosphorochloridothioate reagent. The reaction is somewhat exothermic and the temperature may be controlled by regulating the rate of contacting the reactants and by external cooling. The reaction is carried out in the presence of an inert organic solvent such as acetone, benzene, toluene or methylene chloride. In the preferred method of operation, the reaction is carried out with aqueous ammonia or amine and in a water miscible solvent. Upon completion of the reaction, the desired product is separated in conventional fashion.

In carrying out the reaction, gaseous ammonia or amine is contacted portionwise with the phosphorochloridothioate reagent dissolved in the reaction solvent. This operation is carried out with stirring and at a temperature of from —10° to 30° C. In an alternative procedure, an aqueous solution of ammonia or amine is mixed and blended with the phosphorochloridothioate reagent dissolved in the solvent. Upon completion of the reaction, the reaction mixture is washed with water and water immiscible solvent removed by evaporation to obtain the desired product as a residue.

The following examples illustrate the invention but are not to be construed as a limitation thereof.

EXAMPLE 1
O-(4-cyclohexylphenyl) phosphorodiamidothioate

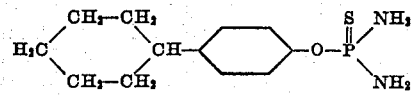

A 26 percent aqueous solution of ammonia (12.6 grams, 0.8 mole of ammonia) was added portionwise with stirring to 103 grams (0.33 mole) of O-(4-cyclohexylphenyl) phosphorodichloridothioate dissolved in 300 milliliters of acetone. The addition was carried out over a period of one hour and at a temperature of from 5° to 15° C. The reaction mixture was stirred for 30 minutes at room temperature after the addition to complete the reaction. The mixture was then washed with water and filtered to obtain an O-(4-cyclohexylphenyl) phosphorodiamidothioate product as a crystalline solid. This product was recrystallized from boiling alcohol and found to melt at 158°–159° C.

EXAMPLE 2
O-(4-cyclohexylphenyl) N,N'-diethyl phosphorodiamidothioate

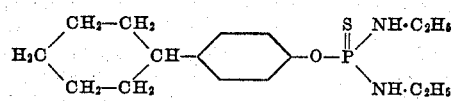

A 25 percent aqueous solution of monoethylamine (36 grams, 0.8 mole of ethylamine) was added portionwise with stirring to 62 grams (0.2 mole) of O-(4-cyclohexylphenyl) phosphorodichloridothioate dissolved in 300 milliliters of benzene. The addition was carried out over a period of one hour and at a temperature of from 10° to 30° C. Following the addition, the mixture was stirred for 30 minutes at room temperature to complete the reaction. The reaction mixture was then washed with water and the benzene removed by evaporation. As a result of these operations, there was obtained an O-(4-cyclohexylphenyl) N,N'-diethyl phosphorodiamidothioate product as a crystalline residue. This product was recrystallized from ethanol and found to melt at 81°–82° C.

EXAMPLE 3
O-(4-cyclohexylphenyl) N,N'-dimethyl phosphorodiamidothioate

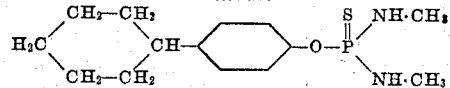

A 25 percent aqueous solution of monomethylamine (31 grams, 1.0 mole of methylamine) is added portionwise with stirring to 62 grams (0.2 mole) of O-(4-cyclohexylphenyl) phosphorodichloridothioate dissolved in 300 milliliters of benzene. The addition is carried out over a period of one hour and at a temperature of from 10° to 20° C. The reaction mixture is then processed as described in Example 2 to obtain an O-(4-cyclohexylphenyl) N,N'-dimethyl phosphorodiamidothioate product as a crystalline solid having a molecular weight of 298.

EXAMPLE 4
O-(2-cyclohexylphenyl) O-methyl phosphoroamidothioate

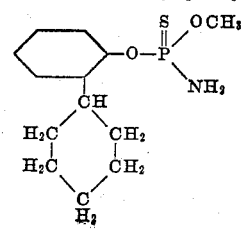

Thirty grams of a 26 percent aqueous solution of ammonia was added slowly with stirring to 60.8 grams (0.2 mole) of O-(2-cyclohexylphenyl) O-methyl phosphorochloridothioate dissolved in 100 milliliters of acetone. The addition was carried out over a period of one hour and at a temperature of from 4° to 7° C. Following the addition, the reaction mixture was washed with water and the washed product extracted with 150 milliliters of methylene chloride. Upon evaporation of the methylene chloride, there was obtained an O-(2-cyclohexylphenyl) O-methylphosphoroamidothioate product as a yellow liquid having a density of 1.179 at 25° C. and a refractive index $n/D$ of 1.5582 at 25° C.

EXAMPLE 5

*O-(4-chloro-2-cyclohexylphenyl) O-methyl phosphoroamidothioate*

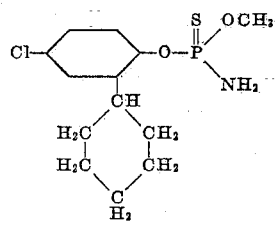

Thirty grams of a 26 percent aqueous solution of ammonia was added slowly with stirring to 68 grams (0.2 mole) of O-(4-chloro-2-cyclohexylphenyl) O-methyl phosphorochloridothioate dissolved in 100 milliliters of acetone. The addition was carried out over a period of one hour and at a temperature of from 3° to 6° C. Following the addition, the reaction mixture was diluted with methylene chloride and the resulting mixture washed with water. The washed mixture was then fractionally distilled under reduced pressure to separate the solvent, and the residue thereafter dissolved in a petroleum ether boiling at from 30° to 60° C. During the latter operation an O-(4-chloro-2-cyclohexylphenyl) O-methyl phosphoroamidothioate product precipitated as a crystalline solid. This product was separated by filtration and found to melt at 74°–75° C.

EXAMPLE 6

*O-(2-chloro-4-cyclohexylphenyl) O-methyl phosphoroamidothioate*

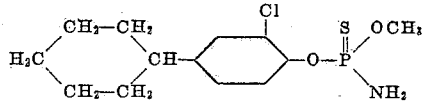

Thirty grams of a 26 percent aqueous solution of ammonia is added portionwise with stirring to 68 grams (0.2 mole) of O-(2-chloro-4-cyclohexylphenyl) O-methyl phosphorochloridothioate dissolved in 100 milliliters of acetone. The addition is carried out over a period of one hour and at a temperature of from 5° to 10° C. The reaction mixture is then processed as described in Example 5 to obtain an O-(2-chloro-4-cyclohexylphenyl) O-methyl phosphoroamidothioate product having a molecular weight of 319.

The new O-(cyclohexylphenyl) phosphoroamidothioates are adapted to be employed for the control of household and agricultural pests. For such use the products may be dispersed on a finely divided carrier and employed as dusts. The new products may also be employed in oils, as constituents in water emulsions or in water dispersions. In a representative operation 100 percent controls of Mexican bean beetles, bean aphids and two spotted spider mites have been obtained with aqueous compositions containing 500 parts by weight of O-(4-chloro-2-cyclohexylphenyl) O-methyl phosphoroamidothioate per million parts by weight of water.

The O-(cyclohexylphenyl) phosphorodichloridothioates employed as starting materials may be prepared by reacting a molecular excess of phosphorus thiochloride with an alkali metal salt of a cyclohexylphenol. Good results are obtained when employing from two to four moles of $PSCl_3$ per mole of the alkali metal phenolate. The phenolate, preferably as the sodium salt, is added portionwise with stirring to the phosphorus thiochloride and the mixture subsequently warmed for a short time to complete the reaction. The crude reaction mixture is filtered and the filtrate fractionally distilled under reduced pressure to separate the product.

The O-(cyclohexylphenyl) O-methyl phosphorochloridothioates as herein employed may be prepared by the reaction at a temperature of from 20° to 90° C. of substantially equimolecular proportions of sodium methylate and an O-(cyclohexylphenyl) phosphorodichloridothioate as above prepared. In carrying out the reaction, a methanol solution of the alcoholate is added portionwise to the phosphorodichloridothioate reagent dispersed in methanol. This operation is carried out with stirring and at the reaction temperature. Upon completion of the reaction, the reaction mixture is washed with water to obtain the desired product as a liquid residue.

We claim:

1. An O-(cyclohexylphenyl) phosphoroamidothioate having the formula

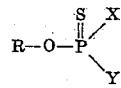

in which R represents a member of the group consisting of 2-cyclohexylphenyl, 4-cyclohexylphenyl, 2-chloro-4-cyclohexylphenyl and 4-chloro-2-cyclohexylphenyl, X represents a member of the group consisting of methoxy and Y, and Y represents a member of the group consisting of amino, methylamino and ethylamino.

2. O-(4-cyclohexylphenyl) phosphorodiamidothioate.
3. O-(4-cyclohexylphenyl) N,N'-diethyl phosphorodiamidothioate.
4. O-(2-cyclohexylphenyl) O-methyl phosphoroamidothioate.
5. O-(4-chloro-2-cyclohexylphenyl) O-methyl phosphoroamidothioate.

References Cited in the file of this patent

UNITED STATES PATENTS

| | | |
|---|---|---|
| 2,385,713 | Kosolapoff | Sept. 25, 1945 |
| 2,506,344 | Cleary | May 2, 1950 |

FOREIGN PATENTS

| | | |
|---|---|---|
| 201,549 | Switzerland | Mar. 1, 1939 |
| 246,915 | Switzerland | Nov. 1, 1947 |
| 814,152 | Germany | Sept. 20, 1951 |